UNITED STATES PATENT OFFICE.

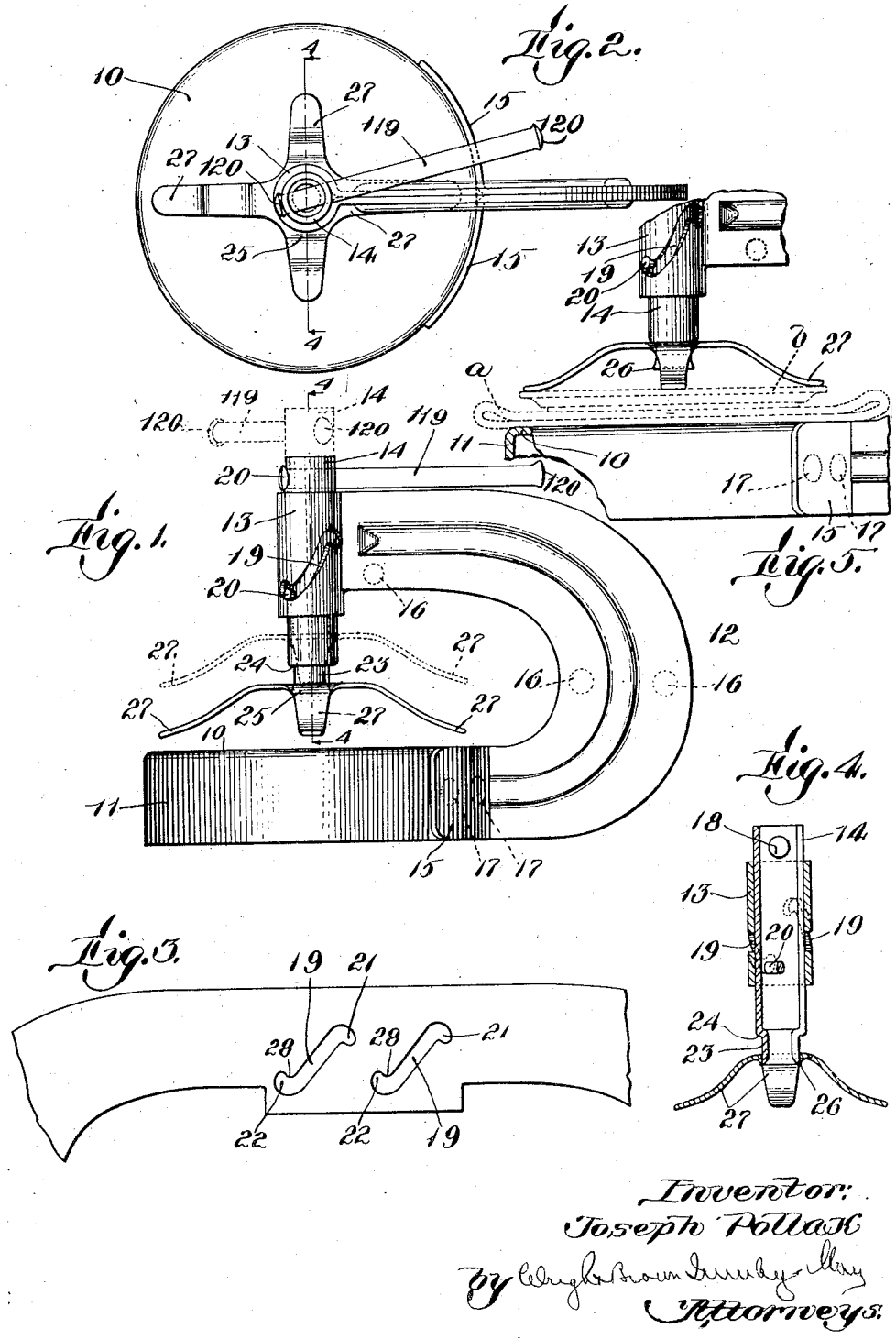

JOSEPH POLLAK, OF DORCHESTER, MASSACHUSETTS.

VULCANIZER.

1,288,181.   Specification of Letters Patent.   Patented Dec. 17, 1918.

Application filed September 5, 1918. Serial No. 252,749.

*To all whom it may concern:*

Be it known that I, JOSEPH POLLAK, a citizen of the United States, residing at Dorchester, in the county of Suffolk and State of Massachusetts, have invented new and useful Improvements in Vulcanizers, of which the following is a specification.

The object of this invention is to provide a simple, inexpensive and efficient device which may be employed for vulcanizing a patch upon a tire tube, and may be used in connection with a pan containing an inflammable material by which the patch is heated and pressed upon the body of the tire, although obviously as will be seen its use is not confined to its employment with such a pan.

On the accompanying drawings,—

Figure 1 represents in side elevation a vulcanizing device embodying the invention.

Fig. 2 represents a plan view of the same.

Fig. 3 represents a portion of the blank which constitutes the bearing of the gooseneck.

Fig. 4 represents in section the spindle on which the spring clamp is journaled.

Fig. 5 shows the clamping member in its lowermost position and indicates by dotted lines the tube to be vulcanized, the patch and the heated pan or plate.

With the exception of the handle by which the spindle is rotated, all of the parts of the device which I shall now describe are formed of sheet metal by means of suitable punching, drawing and shaping dies.

The base of the device consists of an inverted cup, thus affording a flat circular table 10 and a depending peripheral flange 11 upon which the device rests. This base is stamped and drawn from sheet metal. Upon the flat upper surface of the base may be located the part to be vulcanized. Secured to the base there is a gooseneck indicated as a whole at 12. This consists of a single sheet metal stamping, the middle portion of which is bent into cylindrical form indicated at 13 to afford a bearing for a spindle 14. The extremities of the stamping of which the gooseneck is formed, extend in opposite directions and are curved so as to fit upon the exterior of the base flange 11, as indicated at 15. Between the attaching members 15 and the bearing 13, the intermediate portions of the stamping or blank are brought into facial contact and are spot-welded together as indicated at 16, 16. The members 15 are preferably spot-welded as at 17 to the flange 11 of the base. Viewed in side elevation, as in Fig. 1, the intermediate portion of the member 12 constitutes a gooseneck, the bearing of which overhangs the center of the base with its axis approximately coincident with the axis of the base. Within the bearing 13, there is, as previously stated, a spindle 14 which is capable of rotative and sliding movement therein. This spindle also consists of a flat metal blank which is bent into tubular form, as illustrated in Fig. 4. At its upper end it is apertured as at 18 to receive a cross pin 119 by which it may be rotated. The ends of the cross pin or handle 119 are headed as at 120 to prevent its dislocation from the spindle. The handle is sufficiently loose in the apertures 18 to permit it to move endwise to vary the leverage upon the spindle. The bearing 13 is provided with one or more cam slots 19 with which are operatively engaged projections, *i. e.* the ends of a cross pin 20 passed through the spindle 14. These slots are helicoidal, each extending through an arc of a little less than 180°. At their ends the slots 19 are provided with offset portions 21, 22, respectively. Those at 21 are located at the upper ends of the slots and those at 22 at the lower ends thereof. These offsets furnish sockets to hold the spindle against accidental rotation after it has reached the end of its up and down movement. The lower end of the spindle 14 is reduced in diameter as indicated at 23 to provide a shoulder 24, and upon the reduced end there is placed rotatively a clamping member such as a spider indicated as a whole at 25. The spider is held in place by spreading or upsetting the extremity of the spindle to provide a shoulder 26. The spider is provided with a plurality of spring arms 27 projecting radially from a common center or body portion. Said arms have their extremities terminating in the same plane so that they may be engaged with a plate or other member inserted between them and the material which is located upon the base. By employing resilient sheet material in the construction of the spider, a yielding pressure is secured upon the material being vulcanized. In dotted lines I have indicated at *a* an inner tube to which a patch is being applied by a heated plate or pan indicated in dotted lines at *b*.

After the part to be repaired has been placed upon the base and the member b carrying the patch has been located in position, and, if provided with combustible material, the latter is ready to be ignited, the handle 119 is rotated to rotate the spindle, and, by reason of the engagement of the pin 20 with the helicoidal slot 19, will force the spindle endwise downwardly. The arms of the spider engage the member b, as it descends, and clamp the member b yieldingly against the part a to be vulcanized. As the pin approaches the lower ends of the slots 19, it finally rides into the sockets 22 and is held against reverse rotation by the shoulders or projections 28, as indicated in Fig. 3. As the pin moves upwardly into these sockets, the pressure upon the spider is slightly relieved, the arms of the spider having yielded under pressure sufficiently to permit a slight relief of pressure, without however relieving the element b of the pressure necessary to hold it firmly and yieldingly against the part to be vulcanized.

The arms of the spider are sufficiently resilient to compensate for variations in the thickness of the parts which are to be vulcanized together, the rubber of course itself being yielding under pressure. I consider it to be advantageous to employ, in connection with the spindle, the helicoidal cam slots by which, during a predetermined rotation of the spindle, the spindle and the spider are moved up and down always to the same extent, and the extensions or sockets at the ends of the slots, whereby the spindle is locked or held at either extreme of its movement.

Having thus explained the nature of my said invention and described a way of making and using the same, although without attempting to set forth all of the forms in which it may be made or all of the modes of its use, what I claim is:—

1. A vulcanizing press comprising a base constituting a table, a gooseneck secured to the table and overhanging the same, said gooseneck having at its end a tubular bearing, a clamping member, a spindle supporting said member at its lower end, and means by which oscillation of the spindle about its axis effects the lengthwise movement thereof, consisting of one or more helicoidal or cam slots in said bearing, and projections on said spindle operatively engaged in said slot or slots.

2. A vulcanizing press comprising a base constituting a table, a gooseneck secured to the table and overhanging the same, said gooseneck having at its end a tubular bearing, a clamping member, a spindle supporting said member at its lower end, and means by which oscillation of the spindle about its axis effects the lengthwise movement thereof, consisting of a cross pin carried by said spindle, and helicoidal slots formed in said bearing and engaged by the ends of said pin, said slots having offset ends forming sockets to receive the ends of the pin.

3. A vulcanizing press comprising a drawn metal base consisting of a circular table having a cylindrical dependent rim or flange; a gooseneck consisting of a sheet metal blank doubled on itself and formed with an upright bearing overhanging the table, and at its ends with divergent portions partially encircling the said flange or rim; a spindle formed of sheet metal bent into tubular form, mounted in said bearing; a cross pin passing through said spindle and having its ends operatively engaging in cam slots formed in said bearing; a spider swiveled on the lower end of said spindle and having resilient radial arms; and a handle on said spindle to operate it.

In testimony whereof I have affixed my signature.

JOSEPH POLLAK.

Copies of this patent may be obtained for five cents each, by addressing the "Commissioner of Patents, Washington, D. C."